Aug. 24, 1965  H. S. HARRISON  3,202,264
LIVE ROLLER CONVEYOR
Filed June 12, 1962  8 Sheets-Sheet 3

INVENTOR
HOMER S. HARRISON
BY
ATTORNEYS

Aug. 24, 1965

H. S. HARRISON

3,202,264

LIVE ROLLER CONVEYOR

Filed June 12, 1962

INVENTOR
HOMER S. HARRISON
BY
Barnes, Kisselle, Raisch & Choate
ATTORNEYS

United States Patent Office

3,202,264
Patented Aug. 24, 1965

3,202,264
LIVE ROLLER CONVEYOR
Homer S. Harrison, Detroit, Mich., assignor to Mechanical Handling Systems Inc., Detroit, Mich., a corporation of Michigan
Filed June 12, 1962, Ser. No. 201,914
18 Claims. (Cl. 198—127)

This invention relates to live roller conveyors.

At the present time, live roller conveyors comprise a main frame on which a plurality of spaced rollers are mounted for rotation with their axes extending transversely. The rollers are driven continuously by an endless belt which is positoned beneath the rollers and a reach thereof is held in engagement with the conveyor rollers by pressure rollers. In order to prevent damage to the articles being conveyed when the articles have their movement momentarily interrupted on the conveyor, it is desirable to disengage the driving connection between the belt and the conveyor rollers.

In one type of conveyor presently being used, the pressure rollers are moved out of driving engagement with the belt but still in frictional engagement with the belt by the weight of the article on the conveyors. Thus, triggering rollers which are sensitive to the weight of the article are provided so that, when the movement of the articles is interrupted, the weight of the article actuates a linkage which moves the pressure roller partially away from the underside of the belt. Such an arrangement has the distinct disadvantage in that it tends to be actuated every time an article passes over the sensing roller. In addition, once the movement of the articles is reestablished, the entire load of all the articles is applied simultaneously to the belt producing an excessive load. Because the mechanism is dependent upon the weight of an article, it is necessary to accurately adjust the mechanism for different weight articles.

It is an object of this invention to provide a live roller conveyor wherein the driving connection between the endless belt and the conveyor rollers is completely interrupted when the movement of the articles being conveyed is stopped.

It is a further object of this invention to provide such a live roller conveyor wherein the pressure rollers are movable completely out of engagement with the belt.

It is a further object of the invention to provide such a live roller conveyor which is extremely sensitive and is not dependent upon the weight of the article but merely on the presence of a nonmoving article.

It is a further object of the invention to provide such a live roller conveyor which does not need to be adjusted for each weight of article being handled on the conveyor.

It is a further object of the invention to provide such a live roller conveyor which will progressively release portions of the conveyor into driving engagement with the belt when the movement of the articles is reestablished, so that the entire load is not applied to the belt at one time.

Basically, the invention comprises providing a trigger roller in line in a series of conveyor rollers. Each trigger roller is movable rearwardly when an article is interrupted thereover because of its tracks along the bottom of the article due to its driving connection with the belt. The rearward movement of the trigger roller momentarily disengages a clutch that moves a section of pressure rollers downwardly out of engagement with the belt. Locking means are provided for locking the pressure rollers out of engagement. When the obstruction to movement of the articles along the conveyor is removed so that the articles can again move along the conveyor, each section of pressure rollers is successively released to reengage successive portions of the belt. The reengagement is automatic, one pressure roller section actuating the locking means to release the pressure roller section in the succeeding section so that the pressure roller sections can move upwardly into engagement with the underside of the belt.

Figure 1:
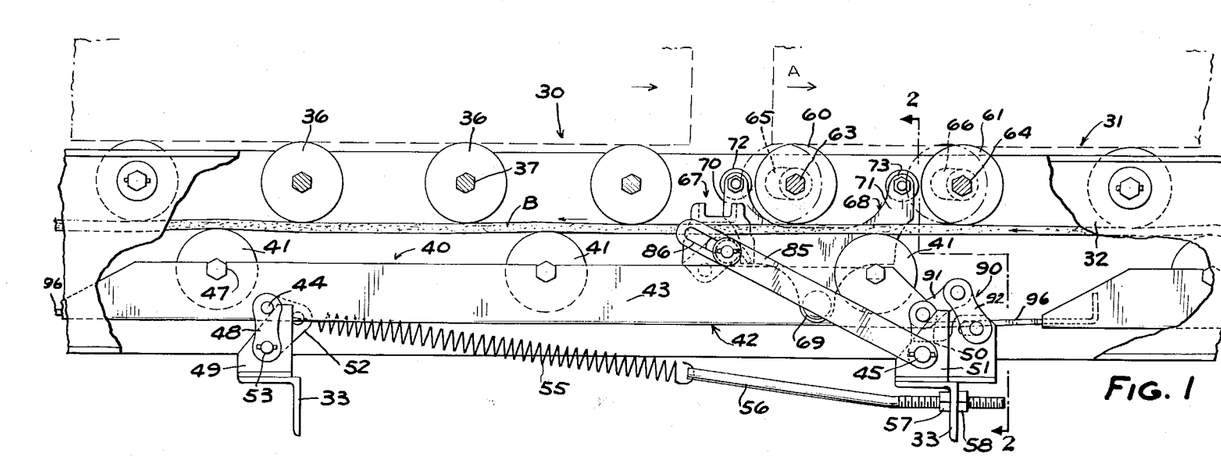
FIG. 1 is a fragmentary part sectional side elevation of a live roller conveyor embodying the invention.
Figure 2:
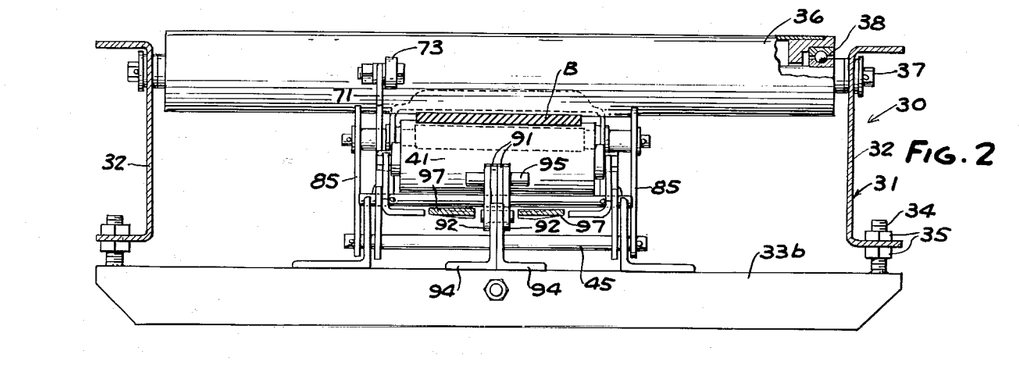
FIG. 2 is a sectional view taken along the line 2—2 in FIG. 1.
Figure 23:
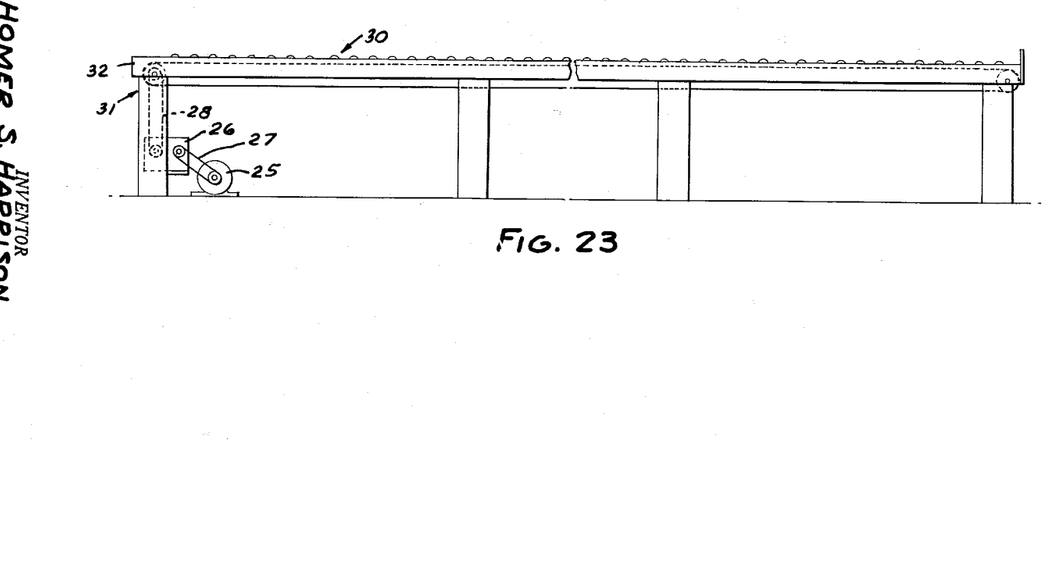
FIG. 23 is a fragmentary side elevation of a live roller conveyor embodying the invention.

Referring to FIGS. 1, 2 and 23, the live roller conveyor 30 embodying the invention comprises a main frame 31 consisting of side rails 32 extending longitudinally of the conveyor and side rails 32 supporting the cross rails 33 by means of adjustable screws 34 and nuts 35. A plurality of transverse conveyor rollers 36 are provided and journalled at longitudinally spaced points on the side rails 32. Each roller 36 includes a shaft 37 extending through an opening in the side rails 32 and a ball bearing 38 rotatably mounting the roller on the shaft 37.

Conveyor rollers 36 are adapted to engage the underside of articles, such as boxes, and move them longitudinally thereover to the right as shown in FIG. 1. In order to achieve this, the rollers are driven from below by engagement with the upper reach of an endless driven belt B. As shown in FIG. 23, endless belt B is driven continuously by electric motor 25 through a gear box 26 and interconnecting endless chains 27, 28. Movement of the belt to the left, as shown in FIG. 1, causes the conveyor rollers 36 to rotate clockwise and move the articles A to be conveyed to the right.

In order to maintain driving engagement between the belt B and the conveyor rollers 36, a plurality of pressure roller assemblies or sections 40 are provided at longitudinally spaced points along the conveyor. Each section includes a plurality of longitudinally spaced presesure rollers 41 which are adapted to be moved upwardly into contact with the underside of the belt B thereby forcing the belt into driving engagement with the conveyor rollers 36.

Figures 3, 4, 5, 6:
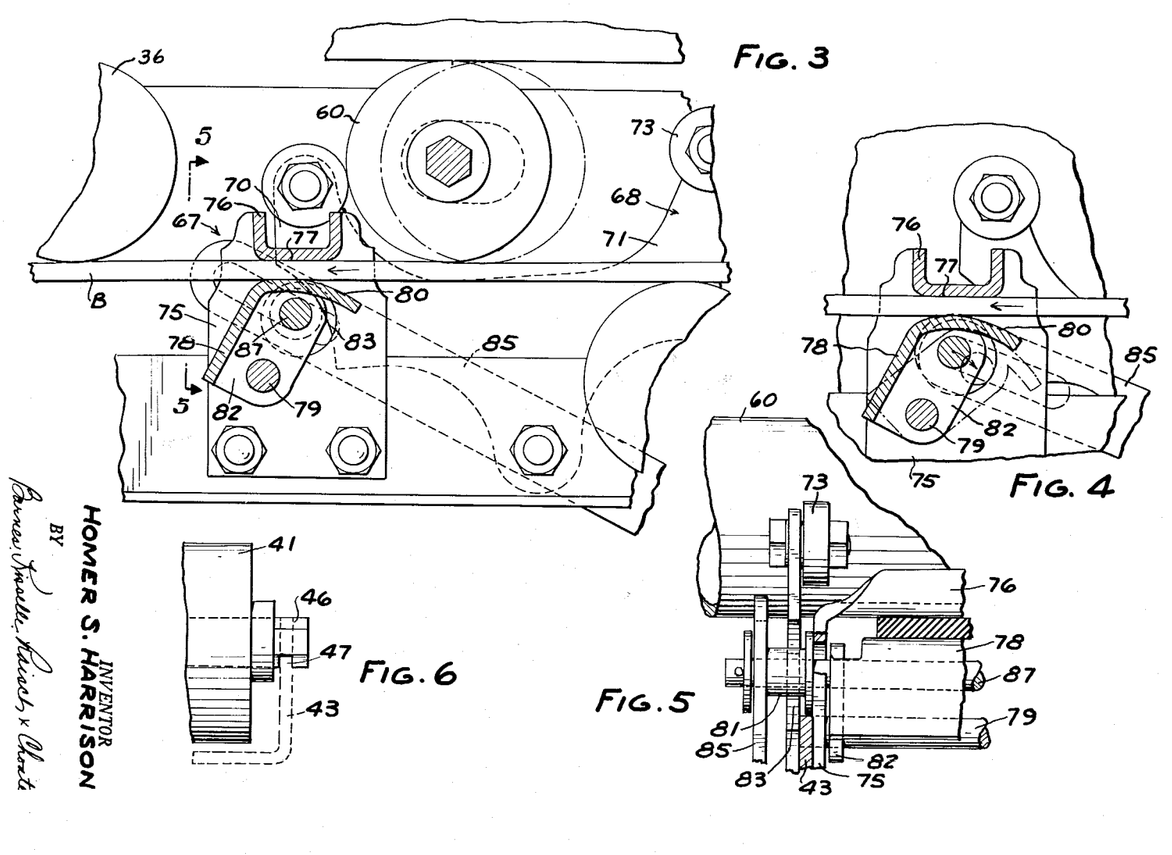
FIG. 3 is a fragmentary sectional view, on an enlarged scale similar to FIG. 1 showing the initial movement of the various parts when a load is interrupted on the conveyor.
FIG. 4 is a fragmentary sectional view similar to FIG. 3 showing a further position of the parts.
FIG. 5 is a fragmentary sectional view taken along the line 5—5 in FIG. 3.
FIG. 6 is a fragmentary side elevation of one of the pressure rollers utilized in the apparatus shown in FIGS. 1–5.
Figure 7:
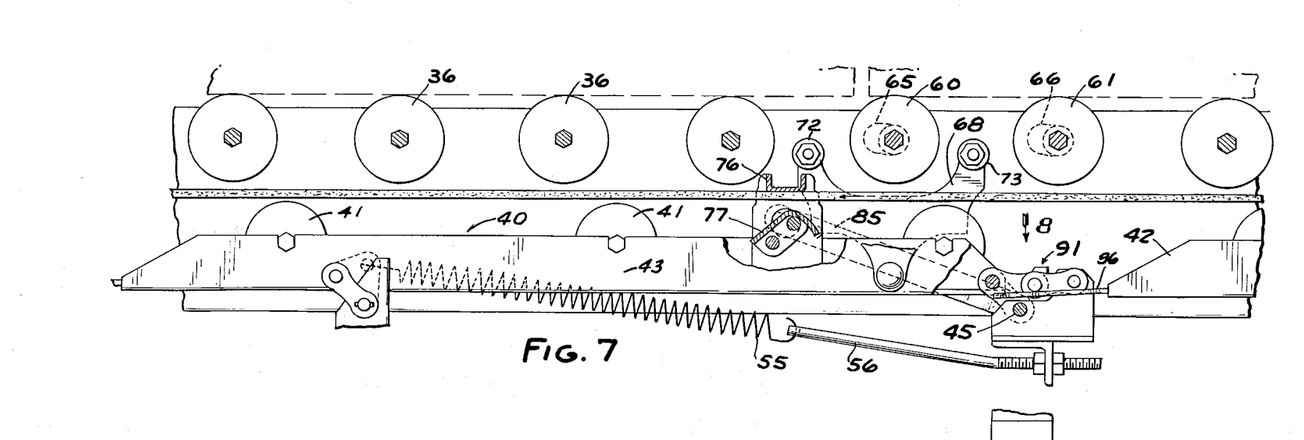
FIG. 7 is a view similar to FIG. 1 showing the relative positions of the parts when the pressure rollers have been moved out of engagement with the driving belt.

As shown in FIGS. 1 and 2, each pressure roller section comprises a pressure roller frame 42 consisting of side members 43 connected by transverse rods 44, 45 extending between the side members 43. The pressure rollers 41 are provided with notches 46 in the shafts thereof which engage upwardly opening slots 47 in the upper edges of the side members 43 (FIG. 6).

The pressure roller frame 42 is mounted for movement toward and away from the belt at one end by links 48 which are pivoted to the rod 44 and pins 53 on brackets 49 fixed on a cross-rail 33 and at the other end by links 50 pivoted to the other rod 44 and to brackets 51 fixed on another cross-rail 33. By this arrangement, the pressure roller frame 42 and, in turn, the rollers 41 are mounted for movement upwardly and forwardly of the conveyor toward the belt and downwardly and rearwardly of the conveyor away from the belt. A vertical spring plate 52 mounted on the rod 44 and pin 53 serves as an anchor for one end of the tension spring 55 which yieldingly urges the pressure roller frame 42 upwardly. The other end of the spring is connected to a rod 56 that is adjustably mounted on a cross-rail 33 by nuts 57, 58 so that the tension on the spring 55 can be varied.

When the movement of the articles being conveyed is interrupted, the pressure roller frame 42 is moved downwardly out of engagement with the belt B. In order to achieve this movement, a pair of trigger rollers 60, 61 are mounted on side rails 32 with the shafts 63, 64 thereof riding in slots 65, 66. The lower edges of the slots extend upwardly and rearwardly for reasons presently described. Trigger rollers 60, 61 are adapted to be driven by belt B.

When an article A is interrupted in its movement along the rollers 36, as when an obstruction is placed in the path of the article, intentionally or otherwise, the belt B engaging the trigger rollers 60, 61 tends to cause the trigger rollers to rotate as usual but the engagement with the article A prevents rotation of the trigger rollers 60, 61 about their shafts. As a result, the trigger rollers 60, 61 track along the bottom of the article A thereby moving rearwardly in the slots 65, 66. This movement causes a clutch 67 to momentarily engage belt B and move the pressure roller frame 42 downwardly and rearwardly thereby moving the pressure rollers 41 out of engagement with the belt B.

The movement of either of the trigger rollers 60, 61 is transmitted to the clutch 67 by a trigger lever 68 which is pivoted to a side 43 of the pressure roller frame by a bolt 69. Trigger lever 68 includes a pair of upwardly extending arms 70, 71 on which rollers 72, 73 are rotatably mounted in position to be engaged by the trigger rollers 60, 61, respectively, as they move rearwardly of the conveyor when an article is stopped over the trigger rollers.

Referring to FIG. 3, clutch 67 is mounted on the pressure roller frame 42 and comprises opposed brackets 75 mounted on the side rails 43 of the pressure roller frame 42. A first fixed clutch member 76 extends transversely between the brackets 75 in overlying relation to the belt B and is provided with a contact surface 77 that is substantially flat. As shown, the cross section of the first clutch member 76 is U-shaped so that the member can be made of sheet metal. A second clutch member 78 is pivoted to a cross pin 79 extending between the brackets 75. Second clutch member 78 includes a transversely extending and longitudinally curved surface 80.

When an article is interrupted in its movement along the conveyor and causes one or more of the trigger rollers 60, 61 to track along the underside thereof and move rearwardly, the trigger lever 68 is swung rearwardly or counterclockwise, as viewed in FIGS. 1 and 3, bringing a cam surface 83 on the rear edge of arm 70 into engagement with a spacer 81 on a second pin 87 extending between the flanged ends 82 of the second clutch member 78 at each end of the clutch member. This swings the clutch member 78 upwardly and rearwardly bringing the surface 80 into engagement with the underside of the belt B and cause the belt B to be gripped between surfaces 77, 80 of the clutch. Since the belt B is moving rearwardly or to the left, as shown in FIGS. 1 and 3, the pressure roller frame 42 is carried rearwardly and due to its linkage to the main frame necessarily moves downwardly out of engagement with the undersurface of the belt B.

As the pressure roller frame 42 moves rearwardly and downwardly, provision is made for disengaging the clutch 67. This comprises links 85 that are pivoted to rod 45 on brackets 51. Each link 85 has an elongated slot 86 therein through which the pin 87 passes. As the pressure roller frame 42 moves downwardly and rearwardly or to the left, as shown in FIGS. 1 and 3, the pin 87 rides in the slots 86. When the pin 87 reaches the end of the slots 86, further movement of the second clutch member 78 is prevented so that, as the pressure frame 42 continues to move downwardly and rearwardly because of its momentum, the second clutch member 78 is pivoted clockwise relative to brackets 75 and moves downwardly relative to the first clutch member 76 disengaging the clutch (FIG. 4). When the clutch is disengaged, trigger rollers 60, 61 are in position to roll forwardly under the action of gravity along the inclined slots 65, 66 to their original position when the article thereon is moved along the conveyor.

Figure 8:
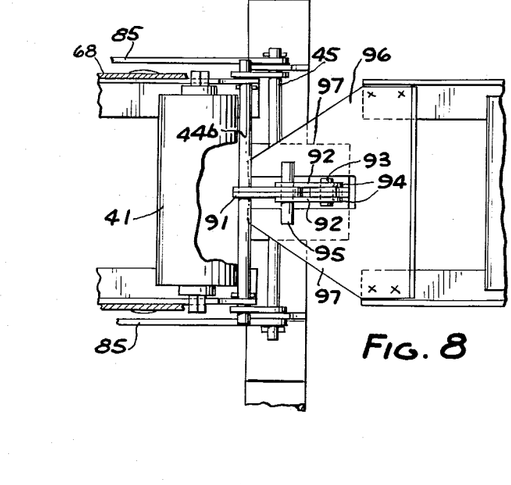
FIG. 8 is a fragmentary view taken in the direction of the arrow 8 in FIG. 7.
Figure 9:
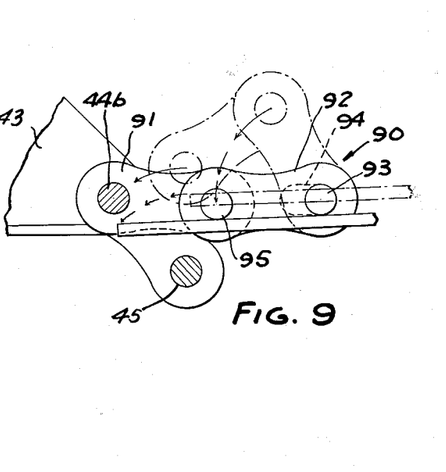
FIG. 9 is a fragmentary sectional view, on an enlarged scale, of a portion of the apparatus shown in FIG. 7.
Figure 10:
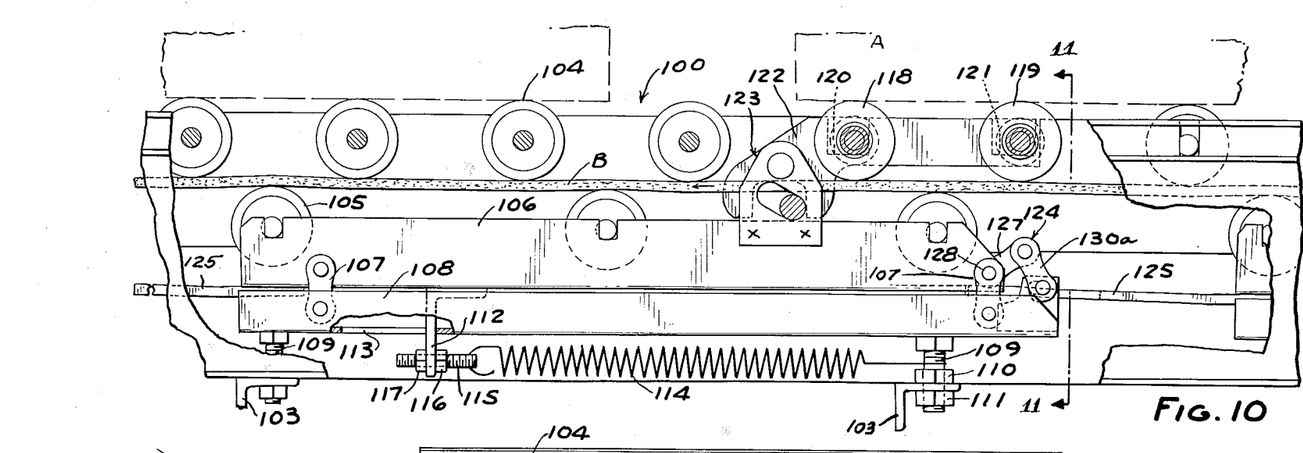
FIG. 10 is a view similar to FIG. 1 showing a modified form of conveyor.
Figure 11:
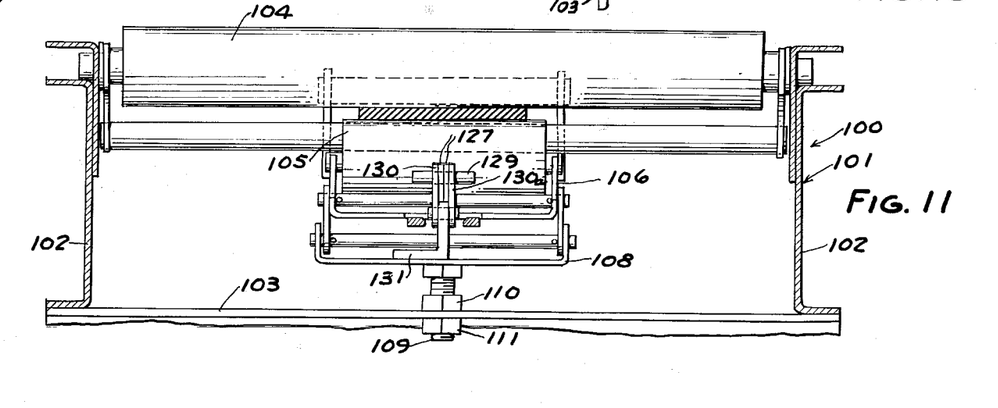
FIG. 11 is a fragmentary sectional view taken along the line 11—11 in FIG. 10.

In order to maintain the pressure roller frame and, in turn, the pressure rollers 41 in their downward position out of engagement with the belt, an overcenter linkage 90 is provided at one end of the pressure roller frame (FIG. 9). As shown in FIGS. 1, 2, 7, 8, and 9, the overcenter linkage 90 comprises a first pair of links 91 pivoted to one end of the pressure roller frame on a cross pin 44b and a second pair of links 92 pivoted to the other end of the links 91 by a pin 95 and to brackets 94 by a pin 93 fixed to cross-rail 33b. Links 92 include slots 94 through which the pin 93 extends so that there is some permissible relative movement between the links 92 and pin 93.

When the pressure roller frame 42 is moved downwardly, the links 91, 92 are extended so that the pin 95 that connects the links 91, 92 is moved overcenter locking the pressure roller frame 42 in lowered position. The overcenter linkage 90 is retained in locked position and returned to its unlocked position, permitting the spring 55 to move the pressure roller frame 42 upwardly, by a release plate 96 fixed on the rear end of the preceding pressure frame 42 so that, when the preceding pressure roller frame moves upwardly, the arms 97 of the release plate 96 engage the pin 93 moving the overcenter linkage upwardly (FIG. 8).

Thus, when a succession of articles is released by removal of the obstruction to movement, pressure roller mechanisms are successively brought into engagement with the belt B so that successive portions of the live roller conveyor are energized. In this fashion, the entire load is not placed on the belt B at one time. It should be understood that the first pressure roller frame on the conveyor would be locked and released by a mechanism controlled automatically or manually.

In the form of the invention shown in FIGS. 10-16, a live roller conveyor 100 comprises a main frame 101 consisting of side rails 102 and cross-rails 103 as in the previous form of the invention. The conveyor rollers 104 are rotatably mounted between the side rails 102 at longitudinally spaced points and the belt B is driven below the conveyor rollers. Pressure rollers 105 are rotatably mounted in a flanged pressure roller frame 106 which, in turn, is connected by links 107 to a flanged intermediate frame 108. Intermediate frame 108 is mounted for vertical adjustment on cross members 103 by threaded studs 109 fixed to the underside of the intermediate member and extending through the cross members 103. Lock nuts 110, 111 are threaded on studs 109. A bracket 112 is fixed to the underside of the pressure roller frame 106 and extends downwardly through a slot 113 in the intermediate frame to form an anchor for one end of a tension spring 114. The other end of the tension spring 114 is fixed to the forward stud 109. A screw 115 forms the adjustable connection between the first mentioned end of the spring 114 and the bracket 112, lock nuts 116, 117 providing the adjustment.

A pair of trigger rollers 118, 119 are provided in elongated upwardly opening slots 120, 121 formed in the upper side of the side rail. The base of each slot 120, 121 is inclined upwardly and rearwardly, as presently described. The trigger rollers 118, 119 are driven by belt B and are adapted to move rearwardly when an article A stops over the rollers, as in the previous form of the invention. This motion is transmitted by a trigger lever 122 to a clutch 123 which momentarily engages the belt B to swing the pressure roller frame 106 downwardly and rearwardly in a manner similar to the previous form of the invention. An overcenter locking mechanism 124 is provided which is substantially identical to that shown in the previous form of the invention and a release plate 125 on a preceding pressure roller frame 106 releases the overcenter linkage 124 as in the previous form of the invention.

Specifically, overcenter linkage 124 comprises a pair of links 127 pivoted to a cross pin 128 between the flanges of the pressure roller frame 106 and pivoted at the other end to a cross pin 129. A second set of links 130a is pivoted to the cross pin 129 and to a bracket 131 on the intermediate frame 108. When the preceding pressure roller frame 106 moves upwardly, the legs 126 on the release plate 125 engage the pin 129 swinging the overcenter linkage upwardly and permitting the spring 114 to raise the pressure roller frame 106 into engagement with the pressure belt B.

Figure 12:
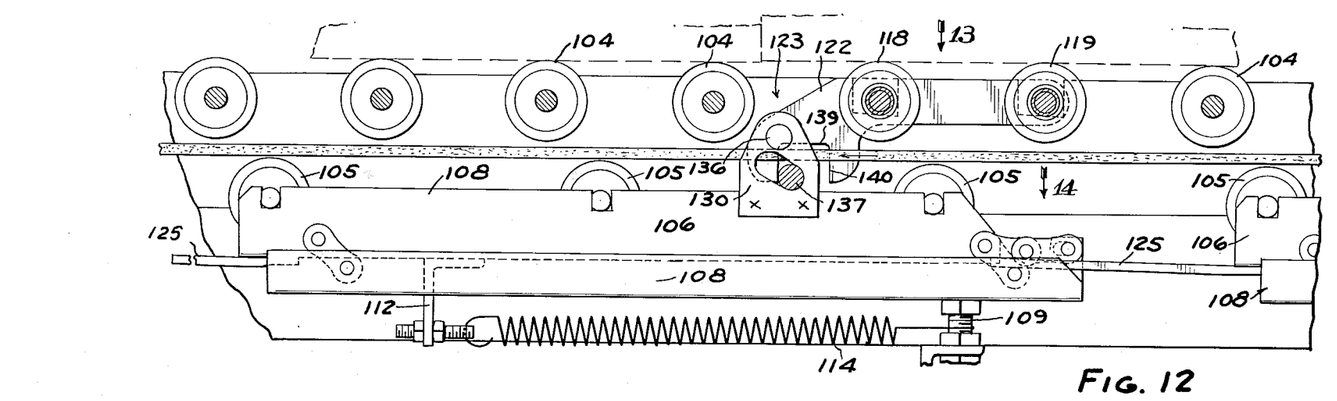
FIG. 12 is a view similar to FIG. 10 showing the relative positions of the parts when the pressure rollers have been moved out of engagement with the driving belt.
Figure 13:
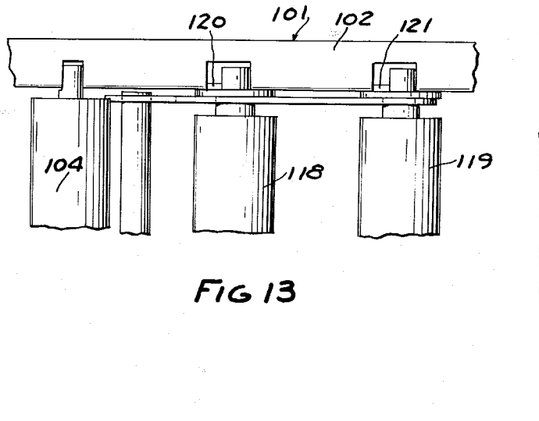
FIG. 13 is a fragmentary plan view taken in the direction of arrow 13 in FIG. 12.
Figure 14:
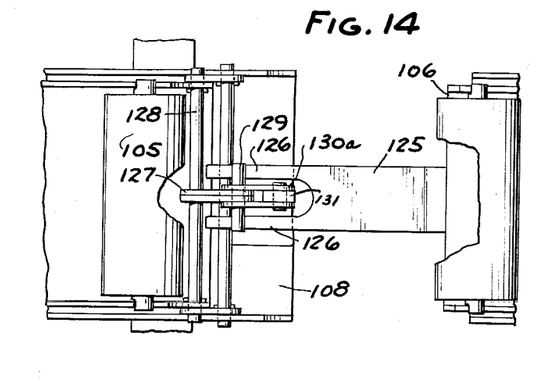
FIG. 14 is a fragmentary plan view taken in the direction of the arrow 14 in FIG. 12.
Figure 15:
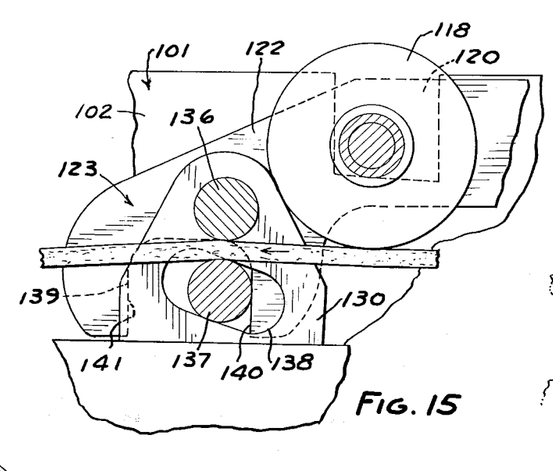
FIG. 15 is a fragmentary sectional view of a portion of the apparatus shown in FIG. 11 showing the relative position of the parts during the initial lowering of the pressure rollers.
Figure 16:
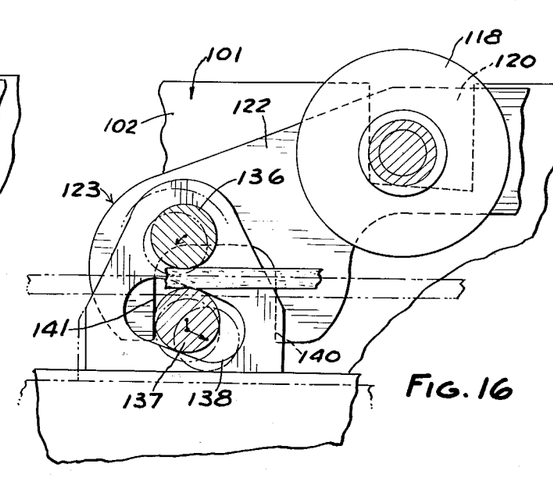
FIG. 16 is a view similar to FIG. 15 showing the relative positions of the parts in a further positon during the lowering of the pressure rollers.
Figure 17:
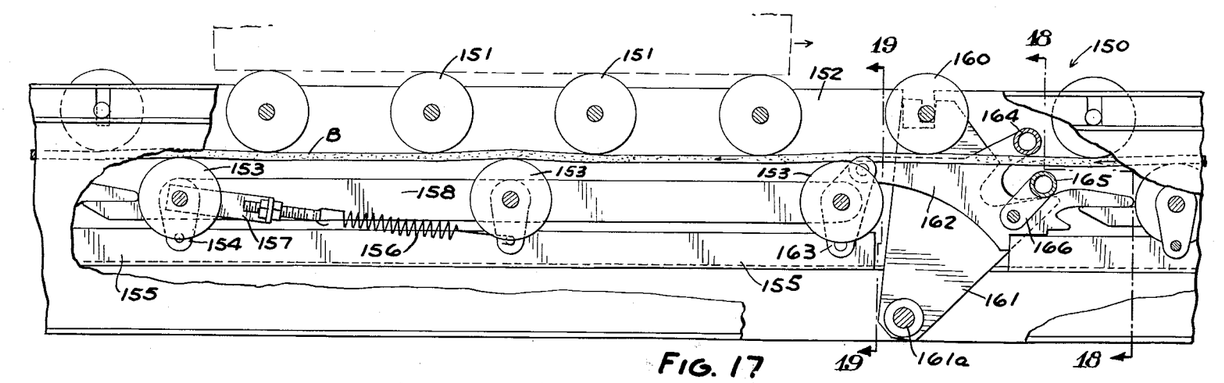
FIG. 17 is a view similar to FIG. 1 showing a futher modified form of the invention.
Figure 18:
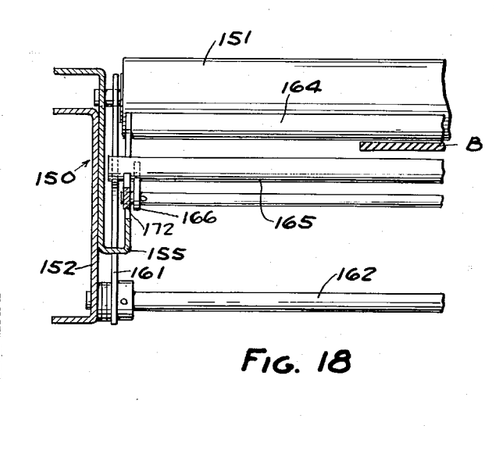
FIG. 18 is a fragmentary sectional view taken along the line 18—18 in FIG. 17.
Figure 19:
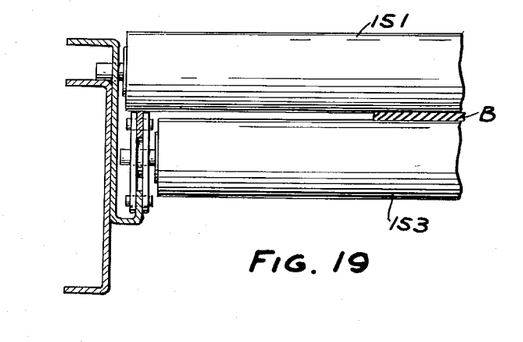
FIG. 19 is a fragmentary sectional view taken along the line 19—19 in FIG. 17.
Figure 20:
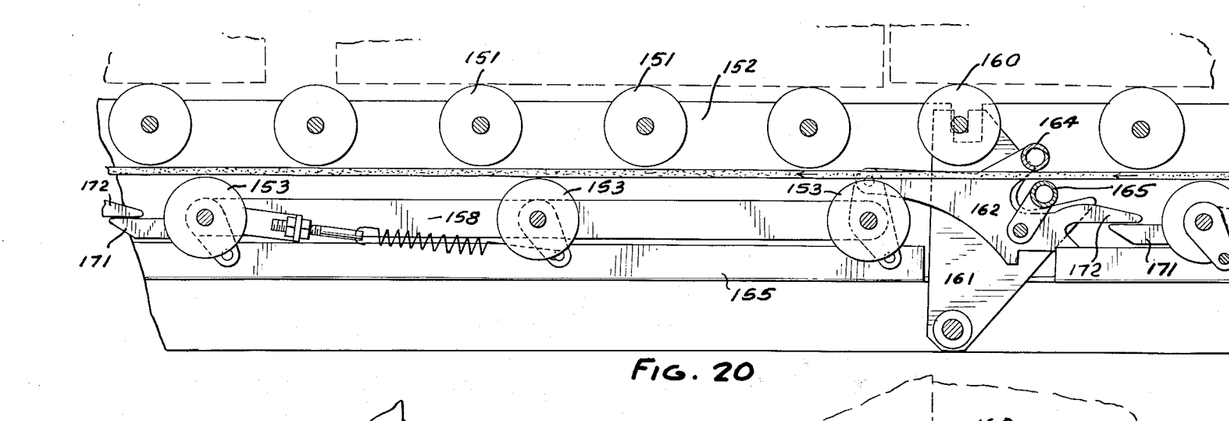
FIG. 20 is a view similar to FIG. 17 showing the relative positions of the parts after the pressure rollers have been lowered out of driving engagement with the driven belt.

Referring to FIGS. 15 and 16, clutch 123 comprises brackets 130 fixed on the flanges of the pressure roller frame 106. A first fixed clutch member comprising a round rod 136 extends transversely between the brackets 130 and is adapted to engage the top surface of the belt and a second clutch member comprising a round rod 137 rides in opposed slots 138 in the brackets 130, the slots 138 extending upwardly and rearwardly relative to the conveyor. As further shown in FIGS. 15 and 16, a trigger lever 122 is mounted on the shafts of the trigger rollers 118, 119 adjacent one end of the trigger rollers. Trigger lever 122 includes a rearwardly extending portion having a downwardly extending opening 139 surrounding the clutch rod 137. When one or more of the trigger rollers 118, 119 move rearwardly because of stoppage of an article thereon, the trigger lever 122 also moves rearwardly bringing the forward edge 140 of the opening 139 into contact with the movable clutch rod 137 and causing the clutch rod 137 to move up the slots 138 and thereby be cammed into engagement with the underside of the belt B (FIG. 15). Movement of the belt B toward the left, as viewed in FIGS. 15 and 16, swings the pressure roller frame 108 rearwardly and downwardly through clutch 123 moving the pressure rollers 105 out of engagement with the underside of the belt B, as shown in FIG. 12. At the same time, the overcenter linkage 124 is extended to lock the pressure roller frame in lowered position. As the movable clutch rod 137 moves up the slot 138 and the pressure roller frame 108 moves downwardly and rearwardly, the clutch rod 137 engages the rear edge 141 of opening 139 and is prevented from further movement. As the pressure roller frame 106 continues to move downwardly and rearwardly, the clutch rod 137 is moved downwardly in slots 138 to disengage the clutch 123 (FIG. 16).

As in the previous form of the invention, when the clutch 123 is disengaged and the load is removed from the trigger rollers, the trigger rollers are free to move down the inclined slots 120, 121 and forwardly to their original position.

When the pressure roller frame 108 of the previous pressure roller section is elevated, the release plate 125 thereof disengages the overcenter linkage 124 permitting the spring to move the pressure roller frame 108 upwardly to bring the pressure rollers 105 into contact with belt B and, in turn, the belt B into driving engagement with the conveyor rollers 104. This occurs in succession with each pressure roller section.

In the form of the invention shown in FIGS. 17-22, the conveyor 150 comprises a plurality of conveyor rollers 151 mounted between rails 152 in a manner similar to the previous forms of the invention with the belt B extending beneath the conveyor rollers. Pressure rollers 153 are mounted on links 154 which are pivoted to portions 155 of the side rails 152 so that the pressure rollers 153 extend substantially across the entire width of the conveyor. A tension spring 156 extends between a connector 157 and the side frame member 155 to yieldingly urge the pressure rollers upwardly. The pressure rollers are interconnected by side bars 158 which form the pressure roller frame.

In this form of the invention, a single trigger roller 160 is rotatably mounted between plates 161 that are pivoted on a cross rod 161a adjacent rails 152. As in the previous form of the invention, trigger roller is driven by belt B and, when an article is stopped over the trigger roller 160, the trigger roller tends to track on the underside of the article and to move rearwardly of the conveyor. This movement is caused to engage a clutch that, in turn, swings the pressure rollers downwardly out of engagement with the belt B.

Specifically, actuating plates 162 are pivoted to the upper ends of the rearmost links 163 of the pressure roller carrier or frame and carry a transverse tube 164 forming the upper clutch member which is adapted to engage the top surface of the belt. A second tube 165 forms the movable clutch member and extends between arms 166 that are pivoted to the actuating plates 162.

Figure 21:
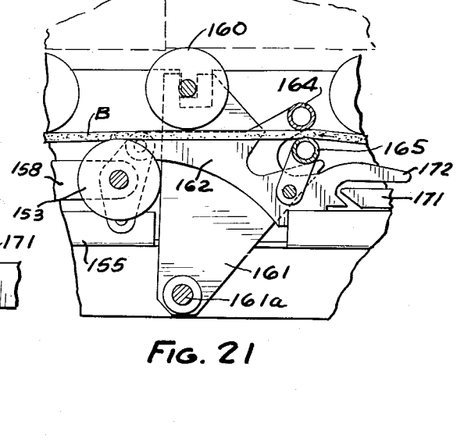
FIG. 21 is a fragmentary view of the apparatus shown in FIG. 17 showing the relative initial positions of the parts when a load is interrupted over the conveyor.
Figure 22:
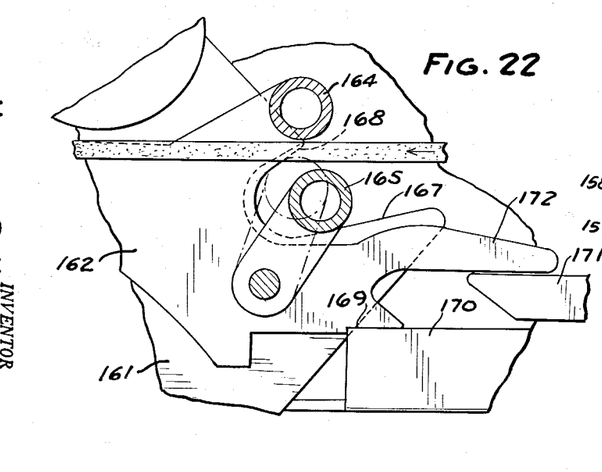
FIG. 22 is a view similar to FIG. 21 showing the further positions of the parts after the pressure rollers have been lowered.

Referring to FIGS. 21 and 22, plates 161 include a cutaway portion defining an upwardly and forwardly extending edge 167 that is adapted to engage the second clutch tube 165 and swing it upwardly into engagement with the bottom surface of the belt B, causing the belt B to be gripped between the clutch tubes 164, 165. This, in turn, causes the plates 161 to move rearwardly and swing the pressure roller carrier downwardly and rearwardly. As the pressure roller carrier begins to move downwardly and rearwardly, a second edge 168 on the plates 161, which extends upwardly and rearwardly, engages the movable clutch tube 165 and moves the clutch tube 165 out of engagement with the belt so that the belt is released.

Actuating plates 162 are formed with a notch 169 that is engaged by a fixed latch 170 when the roller frame is moved downwardly. An unlatching dog 171 is fixed to the rear end of each pressure roller rail 158 and engages an extension 172 on the forward end of the actuating plates 162 of the succeeding roller carrier so that, when one roller carrier is moved upwardly, it causes the plates 162 of the preceding roller carrier to move upwardly out of engagement with the fixed latch 170, permitting the spring 156 to swing the pressure rollers 153 upwardly into engagement with the belt B. In this manner, successive pressure roller sections are engaged with the belt B.

It can thus be seen that there has been provided a novel live roller conveyor wherein the belt is completely disengaged from driving engagement with the conveyor rollers when the movement of articles over the conveyor is interrupted. The mechanism for moving the pressure rollers out of driving engagement with the belt is actuated by the rotation of trigger rollers which track on the underside of the interrupted article. The power of the belt is used to disengage the pressure rollers independently of any weight on the trigger rollers. Thus, the weight of the article has no effect beyond a minimum required to provide frictional engagement for the tracking of the trigger rollers. Upon reestablishment of the movement of the articles along the conveyor, successive pressure roller sections are brought into engagement so that the total load of the articles is not applied simultaneously to the conveyor.

I claim:

1. A conveyor comprising
a frame,
a plurality of conveyor rollers extending transversely and rotatably mounted in the frame,
a belt driven beneath the conveyor rollers,
a plurality of pressure roller sections positioned at longitudinally spaced points beneath said belt for urging the belt into engagement wtih the conveyor rollers to drive the conveyor rollers and, in turn, articles in succession along said conveyor rollers,
means for mounting each said section for movement toward and away from the belt to move the belt into and out of driving engagement with the conveyor rollers,
a trigger roller individual to each said pressure roller section, means for mounting said trigger roller in series with the conveyor rollers with its axis movable longitudinally relative to the axis of the conveyor for engagement by said belt,
said trigger roller being movable rearwardly by tracking along the underside of an article due to engagement of the trigger roller with the belt when an article is interrupted over the trigger roller in its movement on the conveyor,
a clutch adapted to engage and grip said belt,
means actuated by the movement of the trigger roller longitudinally of the conveyor for momentarily engaging said clutch with the belt,
and means operated by the clutch for moving the pressure rollers away from the belt.

2. The combination set forth in claim 1 including means for locking each pressure roller section in position out of driving engagement with the belt, and means responsive to the release of the pressure roller section from locking engagement in one pressure roller section for unlocking the pressure rollers in the succeeding section.

3. The combination set forth in claim 1 wherein said means for mounting said trigger roller supports said trigger roller for movement upwardly as well as rearwardly when tracking relative to an article so that when the movement of the article being conveyed is again permitted the trigger rollers return to their original forward position by the action of gravity.

4. A conveyor comprising
a frame,
a plurality of conveyor rollers extending transversely and rotatably mounted in the frame,
a belt driven beneath the conveyor rollers,
and a plurality of pressure roller sections positioned at longitudinally spaced points beneath said conveyor rollers for urging the belt into engagement with the conveyor rollers to drive the conveyor rollers and, in turn, articles in succession along said conveyor rollers,
each said section comprising a pressure roller frame,
means for mounting said pressure roller frame for movement toward and away from the underside of the belt,
a plurality of longitudinally spaced pressure rollers rotatably mounted in the pressure roller frame transversely of the conveyor and adapted to engage and move the belt into driving contact with the conveyor rollers,
a trigger roller individual to each said pressure roller frame provided in series with the conveyor rollers for engagement with said belt,
means for mounting said trigger roller for movement longitudinally relative to the conveyor,
said trigger roller being movable rearwardly by tracking along the underside of an article due to engagement of the trigger roller with the belt when an article has its movement interrupted above the trigger roller,
a clutch,
said clutch having a first member fixed to the pressure roller frame and extending above the belt and defining a first friction surface engageable with the upper side of the belt which engages the conveyor rollers,
said clutch including a second member movably mounted on the pressure roller frame below the underside of the belt and defining a second friction surface engageable with the underside of the belt,
means responsive to the movement of the trigger roller rearwardly of the conveyor for momentarily engaging the movable clutch member with the lower side of the belt,
and means interconnecting the clutch with the pressure roller frame so that when the clutch is momentarily engaged the pressure roller frame is moved out of engagement with the underside of the belt.

5. The combination set forth in claim 4 including means for disengaging the clutch upon the lowering of the pressure roller frame, said means for disengaging the clutch comprising cam means engaging said second clutch member during the final movement of the pressure roller frame to its position out of engagement with the belt.

6. A conveyor comprising
a conveyor frame,
a plurality of conveyor rollers extending transversely and rotatably mounted in the frame,
a belt driven beneath the conveyor rollers,
a plurality of pressure roller sections positioned at longitudinally spaced points beneath said belt for urging the belt into engagement with the conveyor rollers to drive the rollers and thereby articles in succession along said conveyor rollers,
each said section comprising a pressure roller frame,
means for mounting said pressure roller frame for movement toward and away from the underside of the belt,
a plurality of longitudinally spaced pressure rollers rotatably mounted in the pressure roller frame with their axes parallel to the axes of the conveyor rollers so that the pressure rollers are movable upwardly and downwardly toward and away from the belt for holding and releasing the belt from driving engagement with the conveyor rollers,
a trigger roller individual to each said pressure roller frame interposed in the series of conveyor rollers with its axis parallel to the axis of the conveyor rollers for engagement by said belt, means for mounting said trigger roller for movement rearwardly when an article being conveyed is interrupted in its movement over the trigger roller by tracking of the trigger roller on the underside of the article due to its driving engagement with the belt, a trigger lever pivoted to the pressure roller frame and engageable by movement of the trigger roller rearwardly of the conveyor, a clutch mounted on the pressure roller frame and having a first fixed member overlying the belt and a second movable member underlying the belt, each said clutch member having a surface adapted to engage a portion of the belt, said trigger lever having a cam surface adapted to engage the second clutch member when the trigger roller is moved rearwardly of the conveyor to move the second clutch member upwardly toward the belt and cause the clutch to engage the belt and move the pressure roller frame away from the underside of the belt, means for yieldingly urging the pressure roller frame toward the belt, means responsive to the movement of the pressure roller frame to its lowered position for releasing said clutch, and means for locking said pressure roller frame in its position out of engagement with the belt.

7. The combination set forth in claim 6 wherein said means for mounting said pressure roller frame for movement toward and away from the belt comprises a plurality of links pivoted to the conveyor frame and the pressure roller frame in such a manner that the pressure roller frame is movable upwardly and forwardly and downwardly and rearwardly relative to the conveyor.

8. The combination set forth in claim 6 wherein said trigger lever includes an arm extending upwardly into the path of and adapted to be engaged by said trigger roller.

9. The combination set forth in claim 6 wherein said second clutch member is pivoted to said pressure roller frame for movement upwardly and rearwardly and downwardly and forwardly relative to the conveyor, said means for disengaging said clutch comprising a lever pivoted to said conveyor frame, said lever having a slot therein into which a portion of said second clutch member extends, said second clutch member being adapted to contact the base of said slot as the pressure roller frame is lowered to move the second clutch member forwardly relative to the first clutch member and thereby disengage the clutch.

10. The combination set forth in claim 6 wherein said means for mounting said trigger roller comprises a slot in said conveyor frame, said slot having a base surface which is inclined upwardly and rearwardly so that the trigger roller moves downwardly and forwardly by gravity to its original position when the article thereover is moved along the conveyor.

11. A conveyor comprising a frame, a plurality of conveyor rollers extending transversely and rotatably mounted in the frame, a belt driven beneath the conveyor rollers, a plurality of pressure roller sections positioned at longitudinally spaced points beneath said belt for urging the belt into engagement with the conveyor rollers to drive the conveyor rollers and thereby articles in succession along said conveyor rollers, each said section comprising a pressure roller frame, means for mounting said pressure roller frame for movement toward and away from the underside of the belt, a plurality of longitudinally spaced pressure rollers rotatably mounted in the pressure roller frame with their axes parallel to the axes of the conveyor rollers so that the frame is movable upwardly and downwardly toward and away from the belt for holding and releasing the belt from driving engagement with the conveyor rollers, a trigger roller individual to each said pressure roller frame interposed in the series of conveyor rollers with its axis parallel to the axis of the conveyor rollers for engagement by said belt, means for mounting said trigger roller for movement rearwardly when an article being conveyed is interrupted in its movement over the trigger roller by tracking of the trigger roller on the underside of the article due to its driving engagement with the belt, a trigger lever mounted on and movable with said trigger roller, a clutch mounted on the pressure roller frame and having a first fixed member overlying the belt and a second movable member underlying the belt, each said clutch member having a surface adapted to engage a portion of the belt, said trigger lever having a cam surface adapted to engage the second clutch member when the trigger roller is moved rearwardly of the conveyor to move the second clutch member toward the belt and cause the clutch to engage the belt thereby moving the pressure roller frame away from the underside of the belt, means responsive to the movement of the pressure roller frame to its lowered position for releasing said clutch, and means for locking said pressure roller frame in its position out of engagement with the belt, 12. The combination set forth in claim 11 wherein said second clutch member is movable in slots in the pressure roller frame, said slots extending upwardly and rearwardly, said means for disengaging said second clutch member comprising the extreme upper end of the slots in said pressure roller frame which are engaged by said second clutch member as the pressure roller frame moves downwardly to form an obstruction causing relative movement between the second clutch member and the pressure roller frame to disengage the second clutch member.

13. The combination set forth in claim 11 wherein said second clutch member comprises a rod movable in slots in the pressure roller frame, said slots extending upwardly and rearwardly, said means for disengaging said second clutch member comprising the extreme upper end of the slots in said pressure roller frame which are engaged by said rod as the pressure roller frame moves downwardly to form an obstruction causing relative movement between the rod and the pressure roller frame to disengage the rod.

14. A conveyor comprising a conveyor frame having sides, a plurality of conveyor rollers extending transversely and rotatably mounted in the sides of the frame, a belt driven beneath the rollers, and a plurality of pressure roller sections positioned at longitudinally spaced points beneath said belt for urging the belt into engagement with the conveyor rollers to drive the conveyor rollers and thereby articles in succession along said conveyor rollers, each said section comprising a pressure roller frame, means for mounting said pressure roller frame for movement toward and away from the underside of the belt, a plurality of longitudinally spaced pressure rollers rotatably mounted in the pressure roller frame with their axes parallel to the axes of the conveyor rollers so that the pressure rollers are movable upwardly and downwardly toward and away from the belt for holding and releasing the belt from driving engagement with the conveyor rollers, a pair of trigger members pivoted to the sides of the conveyor frame, a trigger roller interposed in series with the conveyor rollers and rotatably mounted in the trigger members whereby the trigger roller is movable rearwardly relative to the conveyor rollers and swings the trigger members rearwardly when an article is interrupted in its movement on the conveyor over the trigger roller by tracking movement of the trigger roller along the underside of the article due to the engagement of the trigger roller with the belt, clutch means actuated by said rearward pivotal movement of the trigger members for engaging and gripping the belt momentarily, means linking said last mentioned means with the pressure roller frame to lower the frame, means for locking said pressure roller frame in lowered position, and means for releasing said pressure roller frame.

15. The combination set forth in claim 14 wherein said clutch means for engaging the belt comprises, an actuating member pivoted to the pressure roller frame, a first clutch member fixed on said actuating member and overlying the belt, and a second clutch member pivoted to said actuating member and underlying the belt, said actuating member having a cam surface adapted to engage said second clutch member and move it upwardly and rearwardly toward the belt to momentarily engage said clutch.

16. In a conveyor comprising a conveyor frame on which are mounted a plurality of conveyor rollers extending transversely and rotatably mounted in the frame, a belt driven beneath the rollers, the improvement comprising a pressure roller section adapted to be positioned beneath said belt for urging the belt into engagement with the conveyor rollers to drive the conveyor rollers and thereby articles in succession along said conveyor rollers, means for mounting said pressure roller section for movement toward and away from the underside of the belt, a trigger roller individual to said pressure roller section positioned in series with the conveyor rollers for engagement by said belt, means for mounting said trigger roller with its axis movable longitudinally relative to the axis of the conveyor, said trigger roller being movable rearwardly by tracking along the underside of an article due to engagement of the trigger roller with the belt when an article is interrupted over the trigger roller in its movement on the conveyor.

and clutch means operatively engaged with said pressure roller section and responsive to the movement of the trigger roller longitudinally of the conveyor when an article is interrupted over the trigger roller for engaging and gripping the belt momentarily and moving the pressure rollers out of driving engagement with the belt.

17. A conveyor comprising
a main frame,
a plurality of conveyor rollers extending transversely and rotatably mounted in the frame,
a belt driven beneath the conveyor rollers,
a plurality of pressure roller sections positioned at longitudinally spaced points beneath said conveyor rollers for urging the belt into engagement with the conveyor rollers to drive the conveyor rollers and thereby articles in succession along said conveyor rollers,
each said section comprising a pressure roller frame,
means for mounting said pressure roller frame for movement toward and away from the underside of the belt,
a plurality of longitudinally spaced pressure rollers mounted rotatably on said pressure roller frame with their axes parallel to the axes of the conveyor rollers and adapted to engage the underside of the belt,
a pair of trigger rollers individual to each said pressure roller frame mounted in said main frame with an axes of the conveyor rollers,
means for mounting said trigger rollers for movement rearwardly of the conveyor when an article being transported on the conveyor is interrupted in its movement by tracking of the trigger rollers relative to the article because of the driving engagement with the belt,
said trigger rollers being mounted to move rearwardly and slightly upwardly when movement of an article is interrupted thereover,
a clutch mounted on said pressure roller frame,
and a trigger member movable by said trigger rollers rearwardly for momentarily engaging said clutch with said belt to move the pressure roller frame downwardly away from the belt,
said clutch comprising a first member fixed to the pressure roller frame and overlying the belt and a second clutch member movably mounted on the pressure roller frame for movement upwardly into engagement with the underside of the belt.
said trigger member having a cam surface adapted to engage said second movable clutch member to move said second clutch member upwardly into engagement with the underside of the belt.

18. The combination set forth in claim 17 including means responsive to the movement of the pressure roller frame into its lower position for disengaging said second clutch member for clutching engagement with the underside of the belt, said means for disengaging said second clutch member comprising a slot in said pressure roller frame extending upwardly and rearwardly, said second clutch member being operable to engage the rearmost portion of said slot when the pressure roller frame is being lowered to disengage the clutch.

References Cited by the Examiner

UNITED STATES PATENTS

| 2,895,593 | 7/59 | McKnight | 198—160 |
| 3,012,652 | 12/61 | Poel et al. | 198—160 |
| 3,062,359 | 11/62 | McGow | 198—160 |

SAMUEL F. COLEMAN, *Primary Examiner.*

WILLIAM B. LA BORDE, ERNEST A. FALLER, Jr.,
*Examiners.*